United States Patent [19]

Tanaka

[11] Patent Number: 5,678,081
[45] Date of Patent: Oct. 14, 1997

[54] PHOTOGRAPHIC CAMERA HAVING A PICTURE SIZE SWITCHING DEVICE

[75] Inventor: Yasuhiko Tanaka, Saitama-ken, Japan

[73] Assignee: Fuji Photo Optical Co., Ltd., Japan

[21] Appl. No.: 539,357

[22] Filed: Oct. 5, 1995

[30] Foreign Application Priority Data

Oct. 5, 1994 [JP] Japan .................................. 6-266273
Oct. 5, 1994 [JP] Japan .................................. 6-266274

[51] Int. Cl.$^6$ .................................. G03B 17/02; G03B 1/00
[52] U.S. Cl. .................................. 396/284; 396/407; 396/435
[58] Field of Search .................................. 354/94, 159, 215, 354/217, 218, 173.1; 396/407, 435, 284, 387, 406

[56] References Cited

U.S. PATENT DOCUMENTS

| | | | |
|---|---|---|---|
| 4,436,399 | 3/1984 | Koch et al. | 354/159 |
| 4,903,060 | 2/1990 | Hoshino et al. | 354/173.1 |
| 5,066,971 | 11/1991 | Kodaira | 354/465 |
| 5,345,285 | 9/1994 | Hashushita et al. | 354/159 |
| 5,504,549 | 4/1996 | Kazami et al. | 354/173.1 |

*Primary Examiner*—Eddie C. Lee
*Attorney, Agent, or Firm*—Price, Heneveld, Cooper, DeWitt & Litton

[57] ABSTRACT

A photographic camera including a picture size switching device adapted to switch the picture size between a regular size, for example, of 36 mm×24 mm and a panoramic size, for example, of 65 mm×24 mm, wherein, when it is intended to switch the picture size, a predetermined quantity of a roll of film is fed or rewound so that a space of a predetermined extent may be generated between the adjacent previously exposed film frame and the following film frame to be exposed and thereby multiple exposure as well as wastefulness of the film may be avoided. Additionally disclosed is a photographic camera of the so-called preliminary take-up type including a picture size switching device having a spool for taking up the entire roll of film contained within a cartridge in order to measure a full length of the roll of film so that a film quantity rewound during shutter release and a film quantity fed or rewound during changeover of the picture size may be subtracted from the full length of the roll of film to determine a residual film length based on which the number of film frames still available for photographing in the selected picture size may be calculated. The number of film frames may then be displayed to reliably inform a user of the number of frames remaining.

18 Claims, 9 Drawing Sheets

PHOTOGRAPHIC CAMERA HAVING A PICTURE SIZE SWITCHING DEVICE

BACKGROUND OF THE INVENTION

1. Field of the Invention

This invention relates to a photographic camera including a picture size switching device adapted to switch, if it is desired, each film frame between two sizes having different length as measured in the direction of transport of a roll of film.

2. Description of the Related Art

In order to enjoy a variety of expression by photographing, recently a panoramic picture having a configuration corresponding to a regular picture with extended transverse sides has become widely favored among nonprofessional photographers. There are several conventional photographic cameras of the direct viewfinder type and single-lens reflex cameras which allow the picture size to be switched between a regular size and a panoramic size while using a single roll of film. With these photographic cameras, the film frame of the regular size is dimensioned to be 36 mm×24 mm in the case of the camera, for example, using a 35 mm roll of film, and upper and lower portions of such regular-sized film frame are trimmed away, for example, into a configuration of 36 mm×18 mm by the effect of dousers. Such film frame is appropriately enlarged and offered as a panoramic picture. For this sized film frame, the enlarging ratio must be increased with respect to the regular-sized film frame and the picture quality is often correspondingly deteriorated.

To avoid this inconvenience, it is contemplated that the transverse sides of the regular-sized film frame are extended without trimming upper and lower portions so as to obtain a panoramic size, for example, of 65 mm×24 mm. Deterioration of picture quality can thereby avoided, since the same enlarging ratio as for the regular size can be used.

In most cases, the average users use a few film frames for photographing in the panoramic size and many film frames for photographing in the regular size. Accordingly, it is desired that, during use of a single roll of film, the picture size can be switched between the regular size and the panoramic size even with the photographic camera arranged to extend the transverse sides of the regular-sized film frame to define the panoramic-sized film frame.

To achieve this, it is proposed that an aperture 2 provided behind an objective lens 1 is dimensioned to correspond to a dimension of the panoramic size P, as shown by FIG. 12 of the accompanying drawings, and aperture 2 is provided with a picture size switching device. This picture size switching device comprises a pair of dousers 3 extending inward from respective short sides 2a of aperture 2 and are pivotally moved around respective short sides 2a. Specifically, these dousers 3 may be opened to expose the film frame set behind aperture 2 in the panoramic size P and may be closed to trim away opposite transverse sides of aperture 2 and thereby expose the film frame set behind aperture 2 in the regular size L.

Conventional photographic cameras are provided with a film counter mechanism by which a user is reliably informed of the number of film frames. The conventional film counters may be classified as either a forward counting type adapted to display the number of film frames which have already been exposed or a backward counting type adapted to display the number of film frame still available for photographing. With the forward counting type, the count increases as the roll of film is fed due to each operation of the shutter release starting from the count "1", which is displayed immediately after the photographic camera has been loaded with a roll of film. With the backward counting type, on the other hand, immediately after the photographic camera has been loaded with a new roll of film, the number of frames of this roll of film which are available for photographing is displayed and the count progressively decreases for each operation of the shutter release. The mechanism that informs a user of the number of film frames available for photographing immediately after the photographic camera has been loaded with a new roll of film may be classified as either a mechanism utilizing DX code or a mechanism utilizing a preliminary take-up.

With the mechanism utilizing the DX code, the DX code on the outer surface of the cartridge is read by a contact provided within a cartridge chamber to offer the information on the number of film frames available for photographing. With the preliminary take-up mechanism, on the other hand, the entire roll of film contained within the cartridge is taken up by a spool immediately after the photographic camera has been loaded with this roll of film and during this preliminary take-up a full length of the roll of film is measured. This full length may be divided by a film feed quantity for each film frame to calculate the number of film frames available for photographing.

Typically, users wish to know the number of film frames still available for photographing rather than the number of film frames which have already been used. With the forward counting type, a user can determine the number of film frames still available for photographing by subtracting the number of film frames that have already been used for photographing from the number of total film frames on the roll of film that are available for photographing.

However, the conventional picture size switching devices as described above, inevitably encounter a first inconvenience with respect to an automatic feed device as will be described below.

Referring to FIG. 13 of the accompanying drawings, after photographing in the regular size L, the roll of film is fed by a quantity corresponding to the length l of the transverse sides of the regular size L plus a space defined between each pair of adjacent film frames and the photographic camera is made ready for the next photograph. With the photographic camera of the preliminary take-up type, the roll of film is rewound. When it is intended from such state to switch the picture size from the regular size to the panoramic size, the dousers are opened and the opposite transverse portions of the regular size L frame are also exposed. As a result, the film frame of the panoramic size P partially overlaps the previously exposed film frames and partial multiple exposure results.

Referring to FIG. 14 of the accompanying drawings, after photographing in the panoramic size P, the roll of film is fed by a quantity corresponding to the length p of the panoramic size P plus a space defined between a pair of adjacent film frames and thereby the photographic camera is made ready for photographing. When it is intended from this state to switch the picture size from the panoramic size P to the regular size L, the dousers 3 are closed and the transversely opposite portions of the panoramic-sized frames are not exposed. As a result, a wastefully wide space is generated between the exposed film frame and the film frame immediately following.

When a photographic camera incorporating a picture size switching device is provided with the above-mentioned film counter mechanisms, the camera encounters a second problem as will be described below, since the film feed quantity depends on each picture size.

More specifically, the film feed quantity is different by one film frame depending on whether the film frame to be exposed is in the regular size or in the panoramic size and therefore the number of film frames available for photographing is not the same. For example, the film counter mechanism of the forward counting type can inform a user of the number of film frames that have been used for photographing but not the total number of film frames available for photographing. As a consequence, there often occurs unexpected shortage or running out of film and, if a film exchange is made too early to avoid such inconvenience, wastefulness of the roll of film may result.

With the film counter mechanism of the backward counting type, on the other hand, if the DX code is utilized to determine the total number of film frames available for photographing, the number of film frames available for photographing indicated by the DX code is the number of film frames available for photographing all in the regular size. Additionally, a film frame exposed in the panoramic size will correspondingly decrease the number of film frames available for photographing. As a result, there is an apprehension that the counter mechanism might display a residual number of film frames that is less than the actual number of film frames available for photographing. On the other hand, even if the full length of the roll of film has been measured by the preliminary take-up, it will be difficult to calculate the residual number of film frames available for photographing if the full length contains film frames of different picture sizes. Consequently, the film counter mechanism of the backward counting type can not eliminate unexpected running out and wastefulness of the roll of film.

SUMMARY OF THE INVENTION

Accordingly, the present invention has been made to overcome the above problems. Specifically, it is a first object of the invention to provide an improved picture size switching device allowing picture size switching even during photographing with use of a single roll of film without multiple exposure or wastefulness of the roll of film.

To achieve these and other advantages, and in accordance with the purpose of the invention as embodied and broadly described herein, the picture size switching device comprises an adjustable aperture frame disposed within the camera for defining a size of a film frame to be exposed, picture size selecting means for selecting a size of a film frame to be exposed, film position adjusting means responsive to the picture size selecting means, for moving the film relative to the aperture by a predetermined amount when the selected film frame size is different from the size of the previously exposed film frame, and aperture adjusting means responsive to the picture size selecting means, for adjusting the aperture to define a film frame of the selected film frame size. Preferably, a predetermined length of the roll of film is fed or rewound when feeding or rewinding of the roll of film is performed in order to switch the picture size and the roll of film is fed or rewound by a predetermined number of film perforations when feeding or rewinding of the roll of film is performed to switch the picture size.

In view of the above problems, it is a second object of the invention to provide an improved film counter mechanism providing a correct residual number of film frames still available for photographing even when picture size switching occurs during photographing using a single roll of film.

Additional features and advantages of the present invention will be set forth in part in the description which follows and in part will be apparent from the description, or may be learned by practice of the invention.

To achieve these and other advantages, and in accordance with the purpose of the invention as embodied and broadly described herein, the photographic camera adapted to switch a film frame to be exposed on a roll of film between a regular size and a panoramic size, comprises film feeding means for causing the roll of film contained within a cartridge to be taken up by a spool, film rewinding means for causing the roll of film to be rewound into the cartridge, preliminary take-up means for causing the entire roll of film contained within the cartridge to be taken up by the spool after the photographic camera has been loaded with the roll of film, and then causing a predetermined quantity of the roll of film to be rewound into the cartridge for each photograph in order to make the photographic camera ready for photographing, film length measuring means adapted for measuring a full length of the roll of film during the preliminary take-up and for determining a residual quantity of the roll of film on the basis of the film length having been taken up, display means for displaying a current number of film frames on the roll of film still available for photographing, and changeover control means adapted to be operated by a user for selectively switching the picture size. When the changeover control means is operated to switch the picture size from the regular size to the panoramic size, the film rewinding means is actuated to rewind a predetermined quantity of the roll of film and thereby to make the photographic camera ready for photographing in the panoramic size whereas, when the changeover control means is operated to switch the picture size from the panoramic size to the regular size, the film feeding means is actuated to take up a predetermined quantity of the roll of film and thereby to make the photographic camera ready for photographing in the regular size. The number of film frames on the roll of film still available for photographing in the picture size for which the photographic camera is ready is calculated on the basis of a residual quantity of the roll of film. The calculated number of film frames still available for photographing is displayed by the display means.

Preferably, the number of film frames available for photographing can be displayed by display means and both the film length and the film feed quantity can be measured and determined, respectively, by the number of film perforations. Preferably, the film length measuring means includes a photosensor serving to count the number of film perforations passing by this photosensor and the display means includes a field assigned in a liquid crystal display panel adapted to display various photographic information. Preferably, the picture size switching device includes a pair of dousers pivotally supported on respective axes corresponding to respective short sides extending orthogonally to the direction in which the roll of film is transported.

For the photographic camera of the so-called preliminary take-up type, the preliminary take-up occurs upon loading the camera body with the film cartridge and closing its rear lid. Namely, the entire roll of film contained within the film cartridge is taken up by the spool. During the preliminary take-up, a full length of the roll of film available for photographing is measured. This measurement may be achieved in various ways, for example, by calculating this from the number of rotations of a roller adapted to be rotated in operative association with transport of the roll of film or by counting the number of film perforations.

After an operation of the shutter release has caused a film frame to be exposed, the roll of film is fed into the cartridge by the film feed quantity predetermined for the picture size in which the film frame has been exposed. So long as photographs are taken in the regular size, the roll of film is fed upon completion of each exposure by the quantity corresponding to the length of the regular-sized film frame plus the space defined between each pair of adjacent film frames. The film feed quantity is subtracted from the full length of the roll of film available for photographing to calculate the residual length of the roll of film still available for photographing. Upon termination of the film feed, the photographic camera is made ready for photographing and the picture size can be switched at this moment, if it is desired.

The film length available for photographing thus measured is divided by the film feed quantity for each exposure to calculate the number of film frames available for photographing all in the same size. More specifically, the film length may be divided by the film feed quantity for the regular size to calculate the number of film frames available for photographing all in the regular size and may be divided by the film feed quantity for the panoramic size to calculate the number of film frame available for photographing all in the panoramic size.

When the film length is measured by the number of film perforations, the film feed quantity for each picture size is also defined by the number of film perforations. Assuming, for example, that the film feed quantity for the regular size is defined by 8 perforations and the film feed quantity for the panoramic size is defined by 14 perforations, the number of perforations corresponding to the film length available for photographing may be divided by 8 and 14, respectively, to calculate the numbers of film frames available for photographing in the respective picture sizes.

The number of film frames available for photographing is displayed by the unused film frame number display means which may include a liquid crystal display panel externally provided on the camera body or a data display panel adapted to display various data within the viewfinder. Such display means may be arranged in various manners, for example, so as to display side-by-side both the number of film frames available for photographing in the regular size and the number of film frames available for photographing in the panoramic size, or only the number of film frames available for photographing in the picture size to be exposed immediately after or the number of film frames available for photographing in the picture size selected by a user.

When the camera ready for photographing and the user switches the picture size from the regular size to the panoramic size, the roll of film is further fed by a predetermined quantity so that a panoramic-sized film frame may be exposed adjacent to a previously exposed film frame with a predetermined space left therebetween thereby making the photographic camera ready for photographing in the panoramic size. Consequently, the panoramic-sized film frame can be exposed without an apprehension that it might overlap a previously exposed regular-sized film frame causing multiple exposure.

So long as photographs are taken in the panoramic size, the film feed quantity corresponds to the length of the panoramic-sized film frame plus the space defined between each pair of adjacent film frames. Upon termination of the film feed, the photographic camera is made ready for photographing and, if the picture size is switched at this moment from the panoramic size to the regular size, the roll of film is rewound by a predetermined quantity so that the regular-sized film frame may be exposed adjacent to a previously exposed film frame with a space left therebetween thereby making the photographic camera ready for photographing in the regular size. Consequently, the regular-sized film frame is exposed with the rationally small space left between the previously exposed panoramic-sized film frame and wastefulness of the roll of film is avoided.

The film feed or rewind quantity for switching the picture size is predetermined based on the number of film perforations. Assuming, for example, that the length of the regular-sized film frame is defined by 8 perforations and the length of the panoramic-sized film frame is defined by 14 perforations, the regular-sized film frame may be expanded by 3 perforations on each side to define the panoramic-sized film frame, and the film feed or rewind quantity corresponds to 3 perforations.

When the picture size is switched, the number of film frames available for photographing in the picture size selected by this switching is calculated and newly displayed by the unused film frame number display means.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings, which are incorporated in, and constitute a part of, this specification illustrate several embodiments of the invention and together with the description, serve to explain the objects, advantages, and principles of the invention. In the drawings.

DETAILED DESCRIPTION OF THE PREFERRED EMBODIMENTS

Details of the inventive photographic camera equipped with picture size switching device will be better understood from the following description of the preferred embodiments made in reference with the accompanying drawings. It should be understood that although the present invention will be specifically described here as a picture size switching device incorporated in a photographic camera adapted to be loaded with 35 mm film, it could similarly be incorporated in other types of cameras using different sizes of film.

Figure 4:
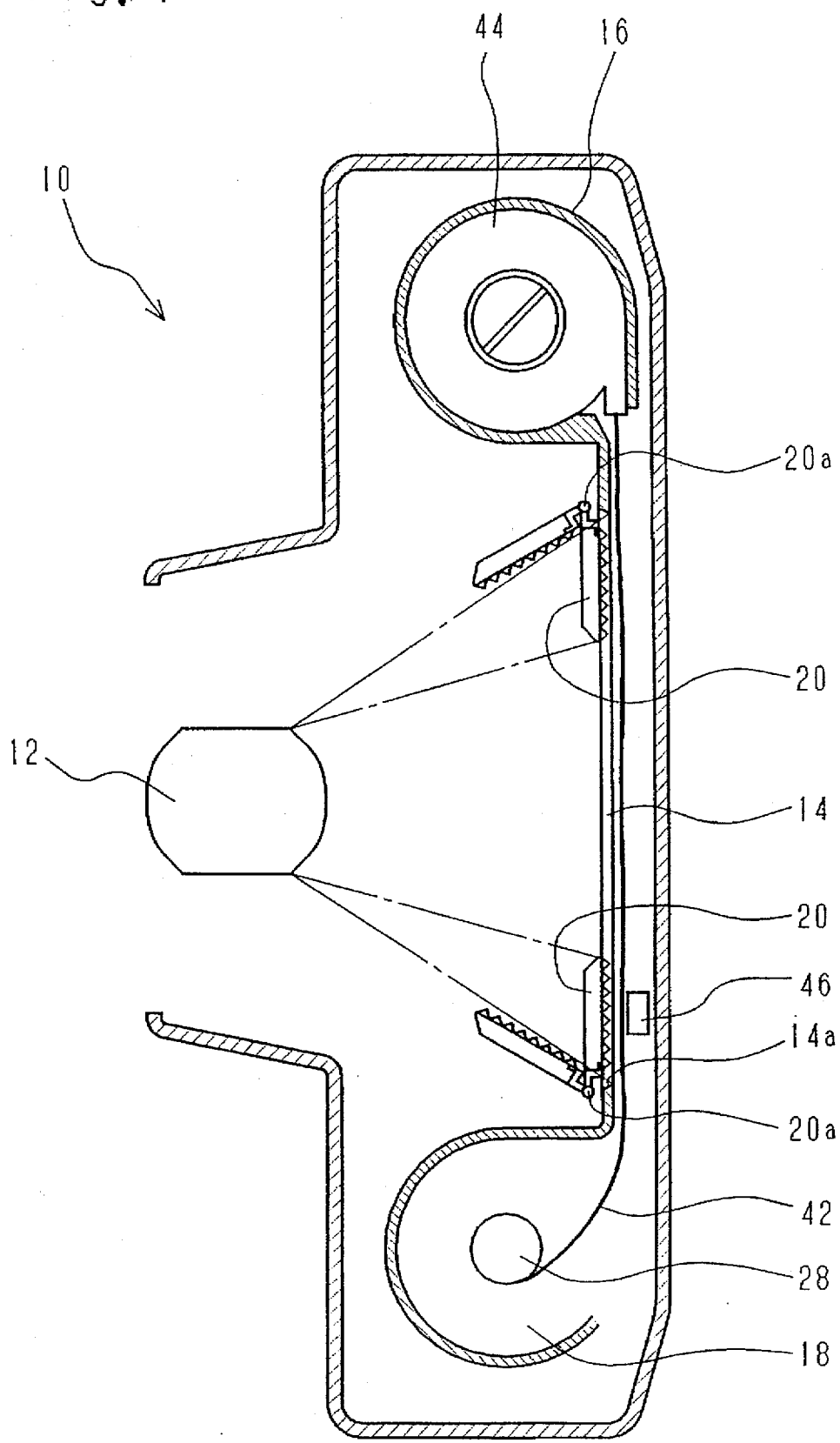
FIG. 4 is a schematic sectional view showing a photographic camera suitable for being equipped with an embodiment of the picture size switching device according to the invention.

Referring to FIG. 4, a photographic camera 10 includes an objective lens 12, an aperture 14 formed behind objective lens 12, and a cartridge chamber 16 and a spool chamber 18 defined on both sides of aperture 14, respectively. Aperture 14 is formed with an aperture framework 14a configured to be long from side-to-side and to be 65 mm×24 mm in dimension, for example, so as to be large enough for exposure of individual film frames in a panoramic size. A pair of dousers 20 are provided on the front side of aperture framework 14a at opposite transverse ends thereof. Each of dousers 20 is adapted to be pivotally movable around an axis extending orthogonal to a direction in which a roll of film 42 is transported. More specifically, dousers 20 are pivotable around a pivot 20a provided in close proximity to the front of each vertical side of aperture 14 associated with each short side of aperture framework 14a. In their opened positions, these dousers 20 swing outward beyond an optical path extending from objective lens 12 to aperture framework 14a, allowing a panoramic-sized film frame to be exposed.

In their closed positions, these dousers 20 extend inward from the respective short sides of aperture framework 14aso that inner edges of the respective dousers 20 cooperate with long sides of aperture framework 14a to define a framework used for exposure of a regular-sized film frame. This regular-sized film frame may, for example, be configured to be long from side to side and to be 36 mm×24 mm in dimension.

Figure 5:
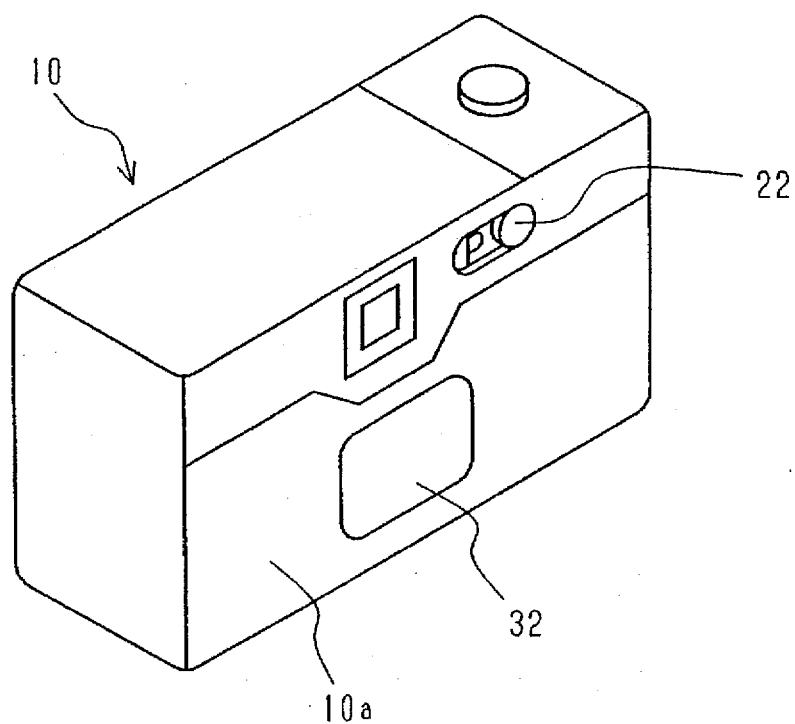
FIG. 5 is a perspective view showing a rear side of the photographic camera equipped with an embodiment of the film counter mechanism according to the invention.

Dousers 20 are driven by a douser rotating device (not shown) which is, in turn, operated under control of an appropriate picture size changeover switch 22 provided, for example, on a rear side of a camera body 10, as shown by FIG. 5. A user may slide picture size changeover switch 22 selectively to the right or left to open or close dousers 20 and thereby change over the mode between photographing in the regular size and photographing in the panoramic size.

As will be apparent from FIG. 4, cartridge chamber 16 is adapted to be loaded with a cartridge 24 and an end of film roll 42 may be taken out from cartridge 24 to be wound on a spool 28 rotatably mounted in spool chamber 18.

Figure 6:
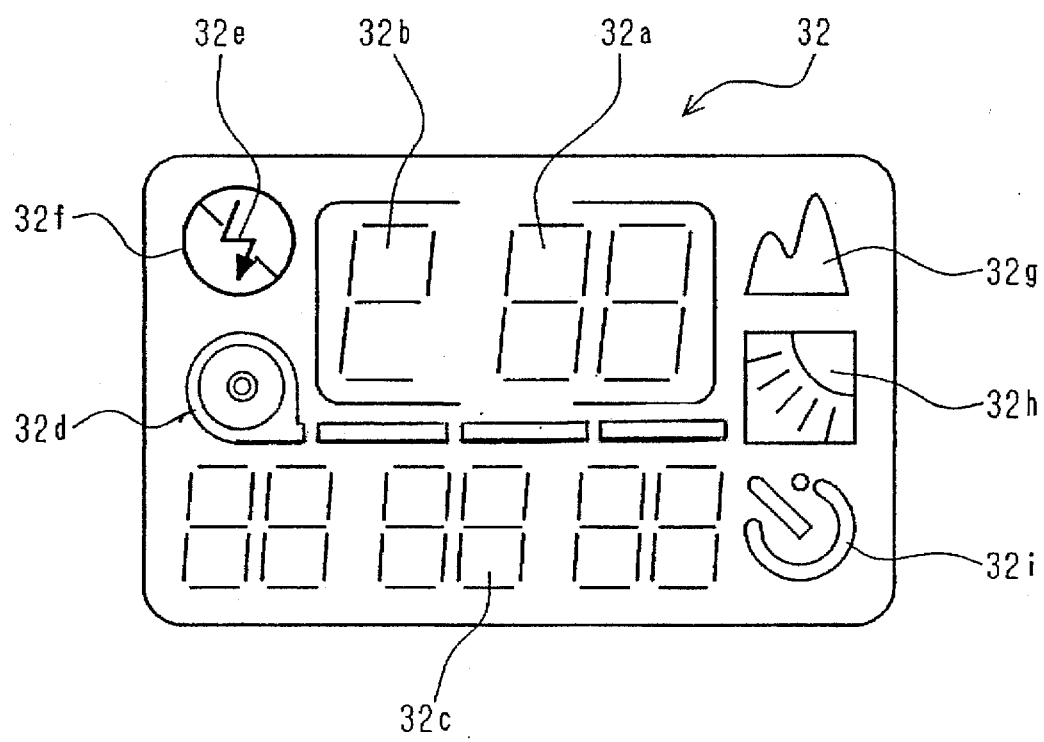
FIG. 6 is a front view illustrating a liquid crystal display panel used for an embodiment of the film counter mechanism according to the invention.

Referring now to FIG. 5, a rear lid 10a of camera body 10 is provided with a liquid crystal display panel 32 including, as shown in detail in FIG. 6, various photographic information display fields such as an unused film frame number display field 32a, a picture size display field 32b, a date display field 32c, a film existence display field 32d, a forced strobe flash display field 32e, a disabled strobe flash display field 32f, a telephotographing display field 32g, a backlight compensation display field 32h, and a self-timer display field 32i.

Figure 7:
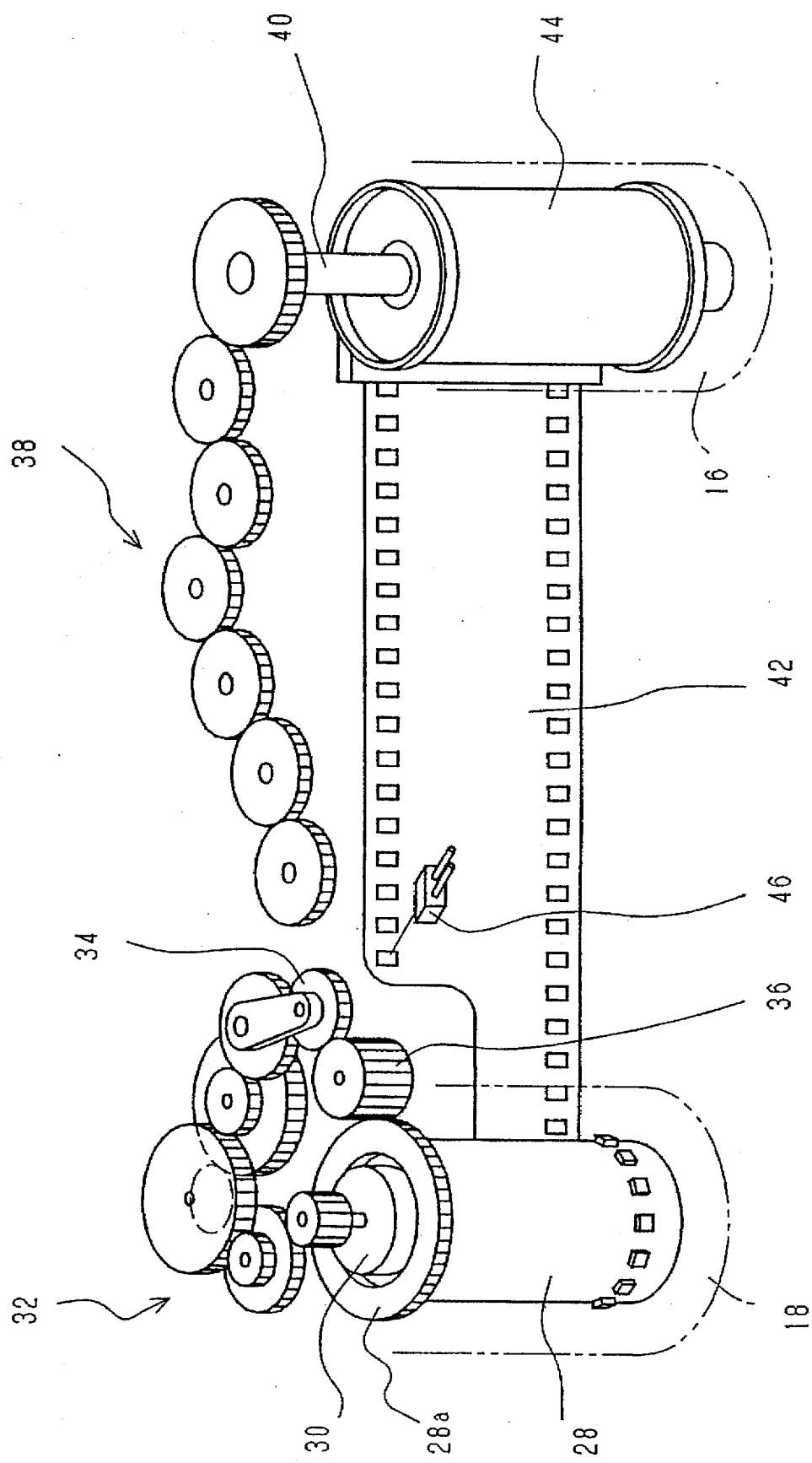
FIG. 7 is a perspective view illustrating, as partially omitted, a film feed mechanism of the photographic camera equipped with an embodiment of the picture size switching device according to the invention.

Referring to FIG. 7, a spool 28 is rotatably mounted within the spool chamber 18 and the spool 28 contains therein a film feed motor 30. A rotary shaft of film feed motor 30 is operatively associated with an appropriate gear train 32 that is, in turn, operatively associated with a planetary gear 34. A rotary shaft of planetary gear 34 is adapted to be swung in a direction depending on the direction in which film feed motor 30 is rotated and planetary gear 34 is brought into engagement with one of the gears arranged on the sides thereof corresponding to the directions in which the rotary shaft of planetary gear 34 may be swung. For example, backward rotation of film feed motor 30 causes a gear 36 to be brought into engagement with a gear 28a provided on an end of spool 28 whereas forward rotation of film feed motor 30 causes planetary gear 34 to be operatively associated with a take-up shaft 40 rotatably mounted within cartridge chamber 16 through an appropriate gear train 38.

In this manner, the gear trains operatively associated with film feed motor 30 are switched from one to another depending on the direction in which film feed motor 30 is rotated so that the forward rotation thereof causes film 42 to be fed to cartridge 44 and the backward rotation thereof causes film 42 to be rewound on spool 28.

At an appropriate location on a path between cartridge chamber 16 and spool chamber 18, there is provided a photosensor 46 adapted to be opposed to a perforation of film 42 and to detect passage of this perforation, allowing the number of perforations having passed the photosensor 46 to be determined by a control unit (not shown).

Figure 1:
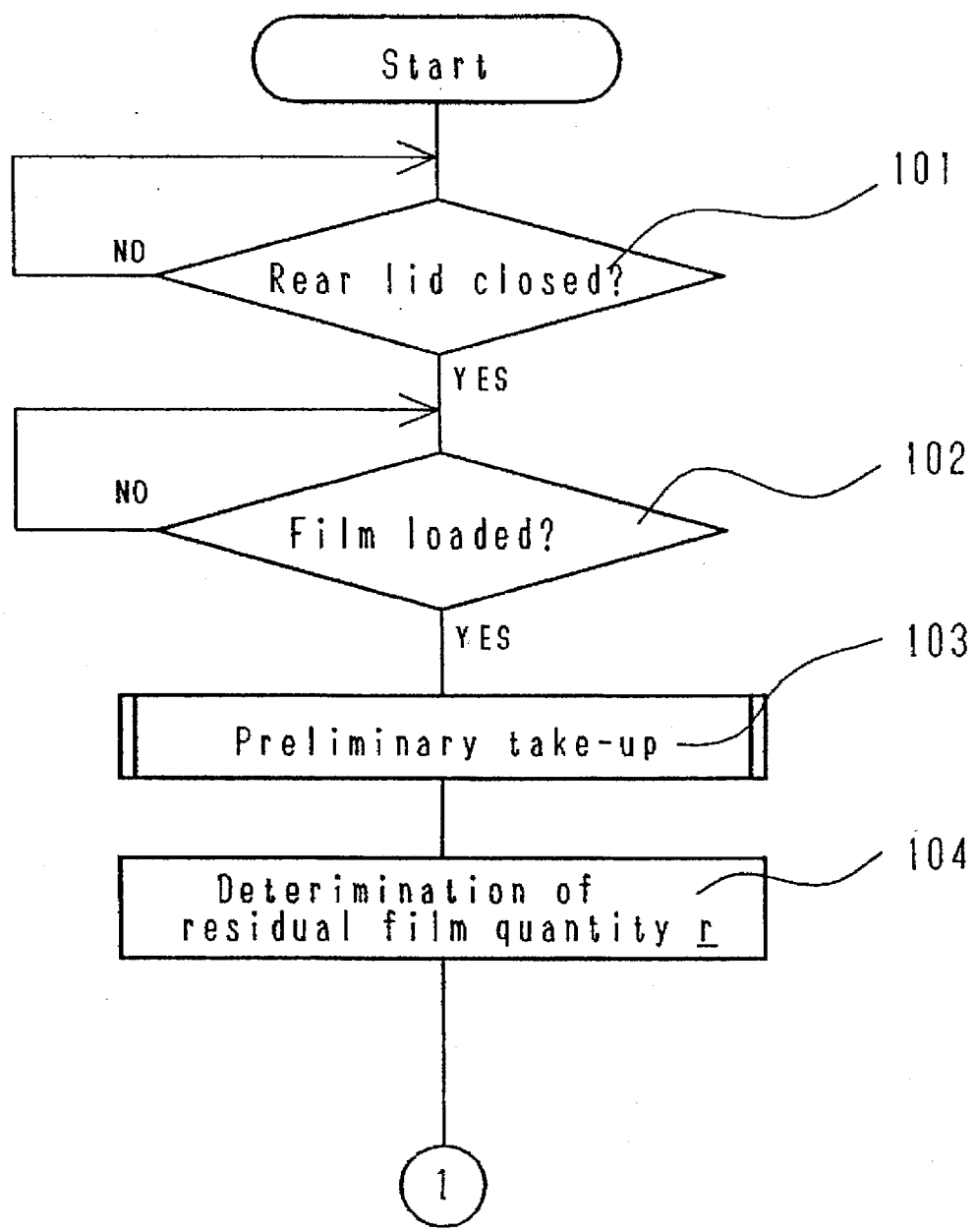
FIG. 1 is a flow chart illustrating a routine for operation of a picture size switching device according to the invention, particularly illustrating a manner in which a film counter mechanism operates.
Figure 2:
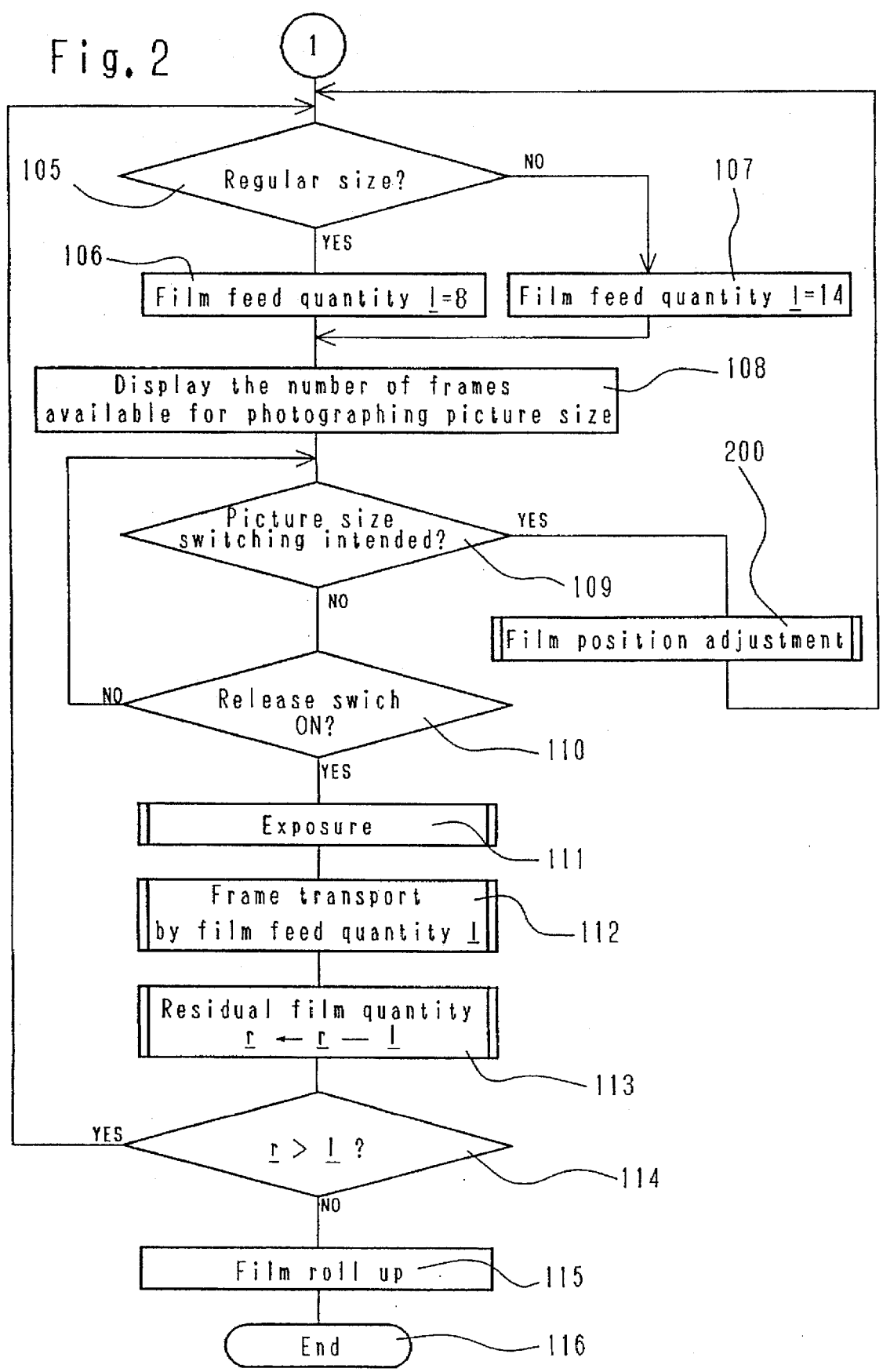
FIG. 2 is a flow chart illustrating a subsequent part of the routine for operation of the picture size switching device according to the invention.
Figure 3:
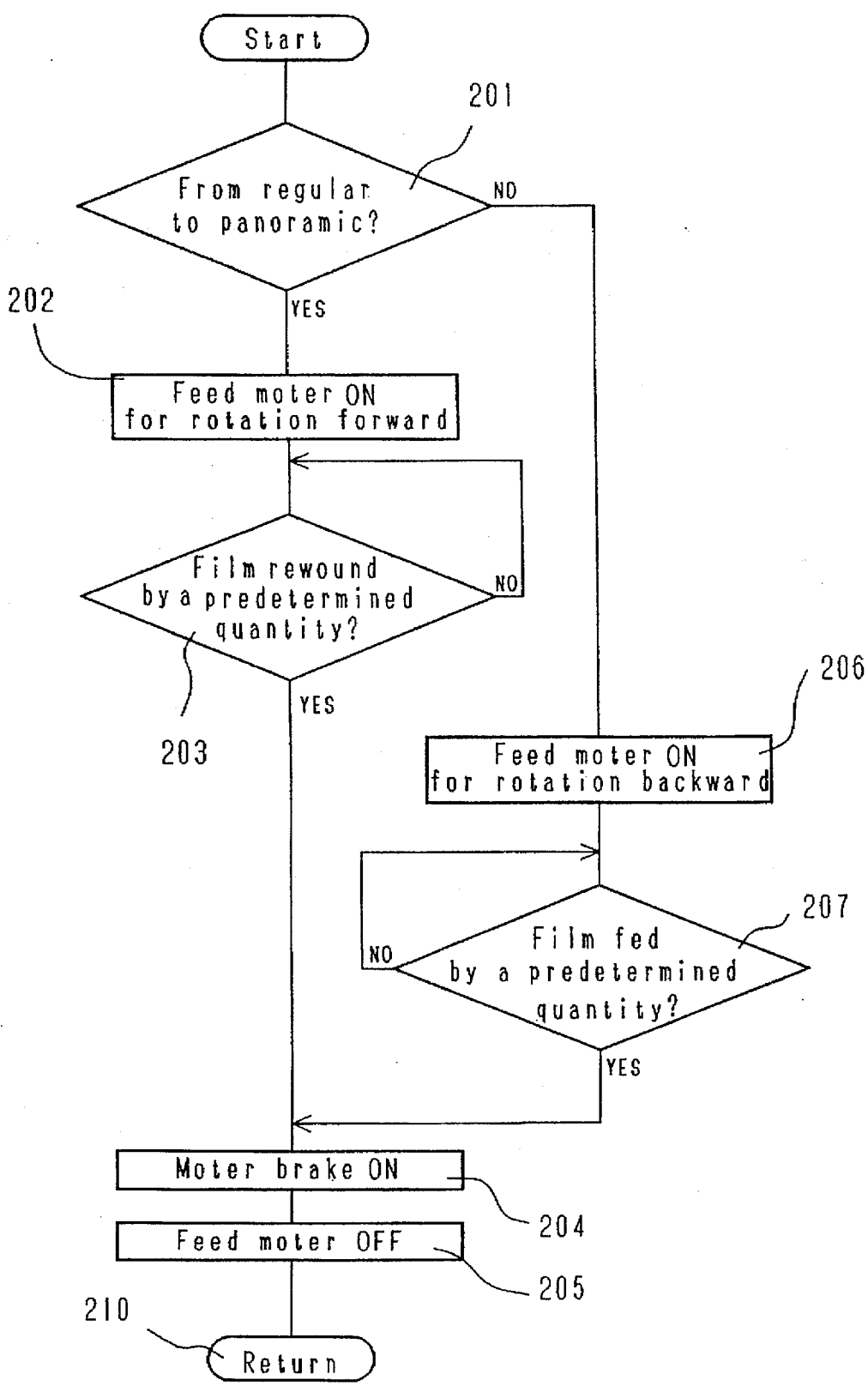
FIG. 3 is a flow chart illustrating a subsequent part of the routine for operation of the picture size switching device according to the invention.

A manner in which the picture size changeover is carried out by the picture size changeover device according to the embodiment as illustrated will be now described in reference to the flow charts shown FIGS. 1-3.

If it is determined that roll of film 42 has been loaded (step 102) and rear lid 10a of camera body 10 has been closed (step 101), film feed motor 30 is rotated backward until the entire roll of film 42 is preliminarily taken up from cartridge 44 onto spool 28 (step 103). Photosensor 46 then detects the number of perforations in the roll of film 42 having been taken up onto spool 28 (step 104) and thereby counts the number of perforations in a length of the roll of film 42 available for actual photographing except longitudinally opposite ends thereof as residual film quantity r.

Depending on the position of picture size changeover switch 22, it is determined whether the film frame to be exposed is of a regular size (step 105) and, if YES, the film feed length 1=8 perforations will be registered (step 106) whereas, if NO, the film feed length l=14 perforations will be registered (step 107). Then, a division of (residual film quantity r)/(film feed length 1) is performed and the result is displayed in the unused film frame number field 32a as the number of film frames still available for photographing (step 108).

Figure 10:
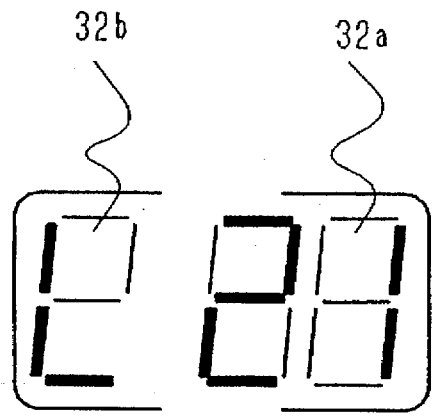
FIG. 10 is a front view illustrating, as partially omitted, various information displayed on a liquid crystal display panel when photographing in the regular size.

For example, in the case of the residual film quantity r=170 perforations, 21 film frames are available for photographing in the regular size according to division of r/l= 170/8=21.3. Consequently, the picture size display field 32b displays a letter "L" and the unused film frame number display field 32a displays "21" representing the number of film frames available for photographing in the regular size, respectively, in the liquid crystal display panel 32, as shown by FIG. 10.

Figure 11:
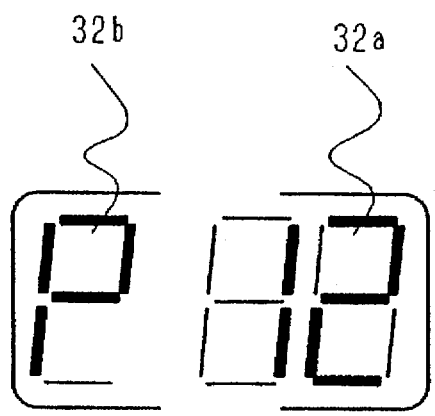
FIG. 11 is a front view illustrating, as partially omitted, various information displayed on the liquid crystal display panel when photographing in the panoramic size.
Figure 12:
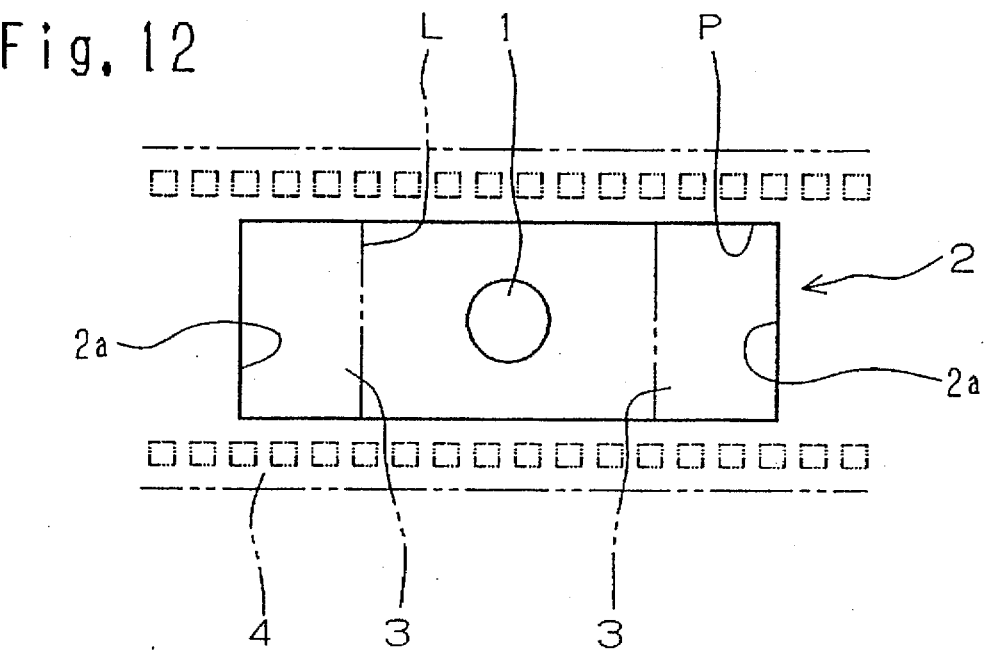
FIG. 12 is a schematic front view illustrating a principle of the picture size switching device according to the invention characterized by a pair of dousers provided in front of the aperture.
Figure 13:
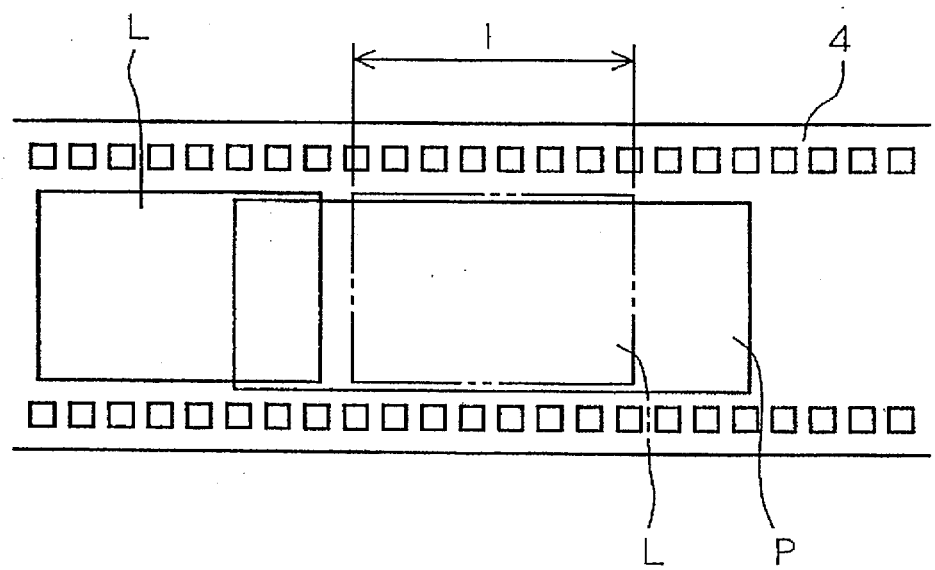
FIG. 13 is a front view of a roll of film illustrating a relative position of successive film frames in the case of changeover from the regular size to the panoramic size by a conventional picture size switching device.
Figure 14:
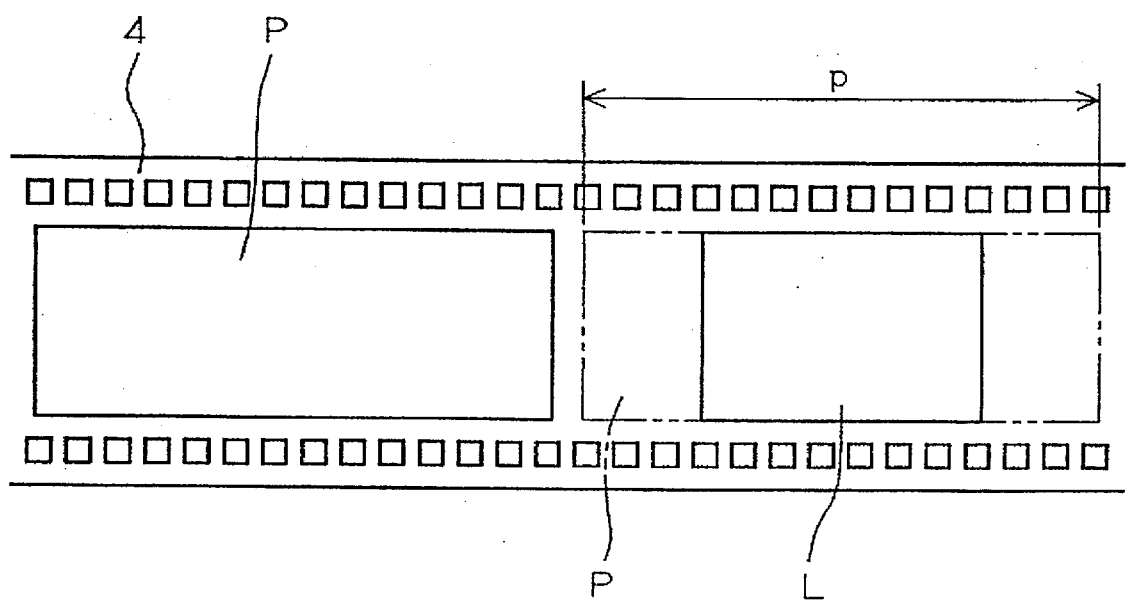
FIG. 14 is a front view of the roll of film illustrating a relative position of successive film frames in the case of changeover from the panoramic size to the regular size by a conventional picture size switching device.

If the residual film quantity r=170 perforations but photographing in the panoramic size is intended, on the other hand, 12 film frames are available for photographing according to division of r/l=170/14 =12.1. Consequently, as shown by FIG. 11, the picture size display field 32b displays a letter "P" and the unused film frame number display field 32a displays "12" representing the number of film frames available for photographing in panoramic size.

It is detected whether the user has operated picture size changeover switch 22 (step 109) and, if YES, the douser rotating device is actuated to change the film feed length l for film position adjustment (step 200).

If the conclusion of step 109 is NO, it is detected whether a release switch has been turned ON (step 110). If NO, the routine returns to the step 109, since the user has not performed an operation.

If the conclusion of step 110 is YES, an exposure takes place (step 111) and the roll of film 42 is fed into cartridge 44 (step 112) by the number of perforations corresponding to the picture size in which the exposure has occurred, i.e., by film feed length l. Specifically, the roll of film 42 will be fed by 8 perforations after the exposure has taken place in the regular size whereas the roll of film 42 will be fed by 14 perforations after the exposure has taken place in the panoramic size.

Once each cycle of film feed has completed, the film feed length l is subtracted from the residual film quantity r to determine a new residual film quantity r (step 113) which is then compared with the film feed length l (step 114). If the comparison results in (residual film quantity r)≧(film feed length l), it is suggested that the roll of film 42 has still one or more film frames available for photographing and the routine returns to the step 105 in preparation for the next photographing. If (residual film quantity r)<(film feed length l), on the other hand, it is suggested that the roll of film 42 has no more film frames available for further photographing, so the residual length of the roll of film 42 is fed into the cartridge (step 115) and thus the photographing with this roll of film 42 is completed (step 116).

If, in step 104, it is detected that picture size changeover switch 22 has been operated, the film position adjustment is made (step 200). Referring to FIG. 3, for this film position adjustment, it is determined whether the operation of the changeover switch 22 has been made from the regular size to the panoramic size (step 201). If YES, dousers 20 are rotated for fully opening aperture 14 and film feed motor 30 is rotated forward (step 202) so that a predetermined length of the roll of film 42 may be fed back into cartridge 44. Then it is determined whether the predetermined length of the roll of film 42 has been fed back into cartridge 44 (step 203).

Figure 8:
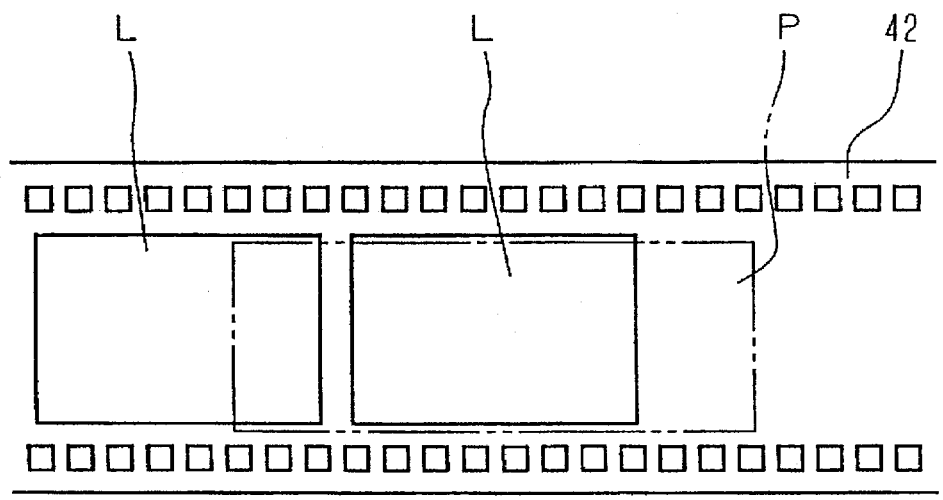
FIG. 8 is a front view illustrating a relative position of successive film frames in the case of changeover from a regular size to a panoramic size.

Assuming that the operation of switching is made from the state ready for photographing in the regular size L to the state ready for photographing in the panoramic size P, followed by exposure without required preliminary operation, a resultant exposed portion of the roll of film 42 would extend in either side by three perforations, respectively, into the previously exposed regular-sized film frame and overlap thereon, as illustrated by FIG. 8. To avoid such error, the roll of film 42 is fed back into cartridge 44 by three perforations so that the film frame of the panoramic size P may be exposed adjacent to and without overlap of the previously exposed film frame.

If, in step 203 shown by FIG. 3, it is detected that the predetermined length of the roll of film 42 has been fed back into cartridge 44, film feed motor 30 is braked (step 204) and its rotation is stopped (step 205). Thereby the camera is made ready for photographing in the picture size selected by the picture size changeover switch 22 and the routine returns to the step 105 (step 210).

If, in step 201, it is detected that the operation of changeover is made from the panoramic size to the regular size, dousers 20 are closed and film feed motor 30 is rotated backward (step 206) and it is determined whether the predetermined length of the roll of film 42 has been fed to spool 28 (step 207).

Figure 9:
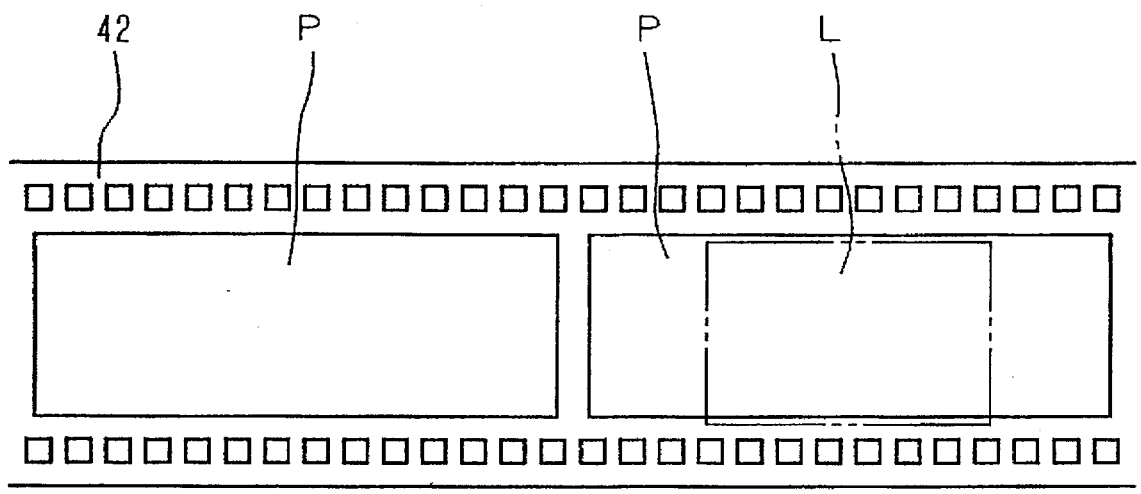
FIG. 9 is a front view illustrating a relative position of successive film frames in the case of changeover from the panoramic size to the regular size.

Assuming that the operation of changeover is made from the state ready for photographing in the panoramic size P to the state ready for photographing in the regular size L followed by exposure without the required preliminary operation, a resultant exposed portion of the film would contract inwardly by three perforations, respectively, with respect to the opposite longitudinal ends of the film frame dimensioned in the panoramic size P and leave an unexposed space corresponding to three perforations adjacent to the previously exposed film frame, as illustrated in FIG. 9. To avoid such wastefulness, the roll of film 42 is fed to spool 28 by the predetermined length corresponding to three perforations so that the film frame of the regular size L may be exposed right next to the previously exposed film frame. After the predetermined length of the roll of film 42 has been fed to spool 28, the routine continues to step 204.

With the present embodiment as has been described heretofore, the picture size can be changed over from the regular size to the panoramic size without the apprehension that the newly exposed film frame might overlap on the immediately preceding film frame, i.e., it is possible to expose the film frame of the panoramic size right next to the film frame of the regular size. In this way, a partial multiple exposure can be avoided, making it possible for the photographic camera having its photographing mode switchable between picture sizes having different lengths along the direction in which the roll of film 42 is transported to achieve errorless photographing.

Even after the mode has been switched from the panoramic size to the regular size, no wasteful space is generated adjacent to the previously exposed film frame. Thereby wastefulness of the roll of film is minimized.

According to the present embodiment, the roll of film 42 may be fed or rewound exactly by three perforations for the picture size switching, since the film feed length is set to 8 perforations for photographing in the regular size L and set to 14 perforations for photographing in the panoramic size P. Thus, transport of the roll of film 42 involves no fractions, allowing the roll of film 42 to be easily controlled and thereby to be reliably transported.

The present embodiment is advantageous also in that a movement of the roll of film 42 can be reliably measured in non-contact manner, since the perforations are counted by the photosensor 38. It should be understood that the perforations may be also counted by the other means, for example, a rotatable sprocket adapted to be engaged with the perforations and a rotary switch adapted to detect an amount of rotation of this sprocket.

While the present embodiment is adapted to determine a movement of the roll of film 42 on the basis of the number of the detected perforations, it is also possible without departing from the scope of the invention to provide a roller adapted to be rotated in operative association with the transport of the roll of film 42 so that a movement of the roll of film 42 may be calculated from the number of rotations of this roller. In this case, it is possible to establish the picture size independently of the perforation spacing.

The present embodiment has still another advantage in that the number of residual film frames available for photographing in the respective picture sizes can be determined even with the photographic camera adapted to be mode-switchable between the picture sizes having different lengths along the direction in which the roll of film is transported. In this manner, unexpected running out of film as well as wastefulness of the roll of film can be avoided.

According to the present embodiment, moreover, every time the picture size has been switched or the shutter has been released, the number of unused film frames is recalculated and redisplayed, ensuring that the relevant display filed continuously displays the exact number of unused film frames.

The present embodiment advantageously allows the user to easily determine the picture size and the number of unused film frames just before each operation of photographing, since the unused film frame number display means comprises an unused film frame display field 32a and a picture size display field 32b which are assigned in a liquid crystal display panel 32 provided on the rear lid 10a of the camera body.

According to the present embodiment, the film length is measured on the basis of the number of perforations, i.e., the film feed quantity for the regular size is defined by 8 perforations and the film feed quantity for the panoramic size is defined by 14 perforations, so the number of unused film frames can be easily and reliably calculated.

As will be understood from the foregoing description, the inventive picture size switching device for photographic camera allows the user to achieve errorless photographing even with the photographic camera adapted to be mode-switchable between photographing in the regular size and photographing in the panoramic size, which corresponds to the regular size expanded in the direction of film transport, since the roll of film is fed, when it is intended to switch the picture size from the regular size to the panoramic size, by a quantity adjusted so that the film frame of the panoramic size may be exposed right next to the previously exposed film frame and a partial multiple exposure in which the panoramic-sized film frame overlaps the just preceding regular-sized film frame may be avoided.

In the case of switching the picture size from the panoramic size to the regular size, on the other hand, the roll of film is rewound by a quantity adjusted so that the regular-sized film frame may be exposed right next to the panoramic-sized film frame that has been exposed immediately before. In this manner, no wasteful space is generated between the just preceding panoramic-sized film frame and the following regular-sized film frame and wastefulness of the roll of film is minimized.

According to the invention, the picture size is switched by feeding or rewinding the roll of film by a predetermined length which is detected on the basis of the number of perforations, so the film length can be measured with an accuracy as high as possible and a space between each pair of adjacent film frames can be maintained at a proper extent.

The film counter mechanism of the invention is adapted to divide the residual film length available for photographing by the film feed quantity for each picture size and thereby to calculate the residual number of film frames available for photographing in each picture size. Such arrangement allows the user to determine the residual number of film frames available for photographing in each picture size even with the photographic camera adapted to be mode-switchable between the regular size and the panoramic size, the latter corresponding to the regular size expanded in the direction of film transport. Accordingly, unexpected running out as well as wastefulness of the roll of film can be minimized and the operation of photographing can be achieved at high efficiency.

The unused film frame number display field displays the current number of film frames available for photographing and ensures that the user can reliably determine the current number of film frames available for photographing.

Furthermore, both the film length and the film feed quantities are measured or defined by the number of film perforations, so the factors such as the film length can be measured with an accuracy as high as possible and the number of film frames available for photographing can be also accurately calculated.

The above described embodiments were chosen for purposes of describing but one application of the invention. It will be understood by those who practice the invention and by those skilled in the art, that various modifications and improvements may be made to the invention without departing from the spirit of the disclosed concepts. The scope of protection afforded is to be determined by the claims and by the breadth of interpretation allowed by law.

The embodiments of the invention in which an exclusive property or privilege is claimed are defined as follows:

1. A photographic camera including a picture size switching device for switching the size of a film frame to be exposed on a roll of film disposed in the photographic camera, said photographic camera comprising:
    an adjustable aperture frame disposed within the camera for defining a size of a film frame to be exposed;
    picture size selecting means for selecting a size of a film frame to be exposed;
    film length measuring means adapted for measuring a full length of the roll of film during a preliminary take-up and for determining a residual quantity of the roll of film on the basis of the film length having been taken up;
    display means for displaying a current number of film frames on the roll of film for the selected film frame size that are still available for photographing;
    film position adjusting means responsive to said picture size selecting means, for moving the film relative to said aperture by a predetermined amount when the selected film frame size is different from the size of the previously exposed film frame; and
    aperture adjusting means responsive to said picture size selecting means, for adjusting said aperture to define a film frame of the selected film frame size.

2. The photographic camera defined in claim 1, wherein said picture size selecting means permits a user to select a regular-sized film frame or a panoramic-sized film frame.

3. The photographic camera as defined in claim 1, wherein said adjustable aperture frame includes a fixed sized aperture framework and a pair of dousers pivotally mounted at opposing ends of said fixed sized aperture framework.

4. The photographic camera as defined in claim 1, wherein said picture size selecting means permits a user to select a regular-sized film frame or a panoramic-sized film frame, and said film position adjusting means feeds additional film when the selected film frame size is changed from regular-sized to panoramic-sized and rewinds a portion of the film when the selected film frame size is changed from panoramic-sized to regular-sized.

5. The photographic camera as defined in claim 1, wherein a predetermined length of the roll of film is fed or rewound when feeding or rewinding of the roll of film is performed to switch the picture size.

6. The photographic camera as defined in claim 1, wherein the roll of film is fed or rewound by a predetermined number of film perforations when feeding or rewinding of the roll of film is performed to switch the picture size.

7. A photographic camera adapted for switching a film frame to be exposed on a roll of film between a regular size and a panoramic size, the camera comprising:

changeover control means adapted to be operated by a user for selectively switching the picture size;

film feeding means for causing the roll of film contained within a cartridge to be taken up by a spool;

calculation means for calculating a residual amount of unexposed film remaining of a roll of film, and for calculating the number of picture frames that may still be taken for the selected picture size;

a display for displaying the number of frames remaining on the roll of film for the selected picture size; and film rewinding means for rewinding the roll of film toward the cartridge;

wherein, when said changeover control means is operated to switch the picture size from the regular size to the panoramic size, said film feeding means is actuated to take up the roll of film by a predetermined quantity to make the photographic camera ready for photographing in the panoramic size whereas, when said changeover control means is operated to switch the picture size from the panoramic size to the regular size, said film rewinding means is actuated to rewind the roll of film by a predetermined quantity to make the photographic camera ready for photographing in the regular size.

8. A photographic camera adapted for switching a film frame to be exposed on a roll of film between a regular size and a panoramic size, the photographic camera comprising:

film feeding means for causing the roll of film contained within a cartridge to be taken up by a spool;

film rewinding means for rewinding the roll of film toward the cartridge;

a preliminary take-up mechanism causing the entire roll of film contained within a cartridge to be taken up by the spool after the photographic camera has been loaded with the roll of film, and then causing a predetermined quantity of the roll of film to be rewound toward the cartridge for each photograph to make the photographic camera ready for use;

changeover control means adapted to be operated by a user for selectively switching the picture size;

means for calculating the length of film on the roll of film that may be exposed during preliminary take-up;

means for calculating the number of frames remaining on the roll of film for the selected picture size; and a display for displaying the number of frames remaining on the roll of film for the selected picture size, wherein, when said changeover control means is operated to switch the picture size from the regular size to the panoramic size, said film rewinding means is actuated to rewind a predetermined quantity of the roll of film to make the photographic camera ready for photographing in the panoramic size whereas, when said changeover control means is operated to switch the picture size from the panoramic size to the regular size, said film feeding means is actuated to take up a predetermined quantity of the roll of film to make the photographic camera ready for photographing in the regular size.

9. The photographic camera as defined in claim 8, wherein a predetermined length of the roll of film is fed or rewound when feeding or rewinding of the roll of film is performed to switch the picture size.

10. The photographic camera as defined in claim 8, wherein the roll of film is fed or rewound by a predetermined number of film perforations when feeding or rewinding of the roll of film is performed to switch the picture size.

11. A method for handling film in a photographic camera adapted for switching a film frame to be exposed on a roll of film between a regular size and a panoramic size, the method comprising the steps of:

preliminarily taking up the entire roll of film contained within a cartridge on a spool after the photographic camera has been loaded with the roll of film;

measuring the full length of the roll of film available for photographing while taking the roll of film up on the spool;

calculating a residual length of the roll film still available for photographing every time each film frame exposed by photographing is rewound into the cartridge;

selecting a film frame size; and dividing the calculated residual length by a film feed quantity for each exposure to calculate a current number of film frames on the roll of film still available for photographing for the selected film frame size.

12. The method as defined in claim 11, wherein both said film length and said film feed quantity are measured and determined, respectively, by the number of film perforations.

13. The photographic camera adapted to switch a film frame to be exposed on a roll of film between a regular size and a panoramic size, the camera comprising:

film feeding means for causing the roll of film contained within a cartridge to be taken up by a spool;

film rewinding means for causing the roll of film to be rewound into the cartridge; preliminary take-up means for causing the entire roll of film contained within the cartridge to be taken up by the spool after the photographic camera has been loaded with the roll of film, and then causing a predetermined quantity of the roll of film to be rewound into the cartridge for each photograph in order to make the photographic camera ready for photographing;

film length measuring means adapted for measuring a full length of the roll of film during the preliminary take-up and to determine a residual quantity of the roll of film on the basis of the film length having been taken up; and changeover control means adapted to be operated by a user for selectively switching the picture size, wherein, when said changeover control means is operated to switch the picture size from the regular size to the panoramic size, said film rewinding means is actuated to rewind a predetermined quantity of the roll of film and thereby to make the photographic camera ready for photographing in the panoramic size whereas, when said changeover control means is operated to switch the picture size from the panoramic size to the regular size, said film feeding means is actuated to take up a predetermined quantity of the roll of film and thereby to make the photographic camera ready for photographing in the regular size, and wherein the number of film frames on the roll of film still available for photographing in the selected picture size is calculated from a residual quantity of the roll of film.

14. The photographic camera as defined in claim 13, and further including a display for displaying the number of film frames available for photographing.

15. A photographic camera adapted to switch a film frame to be exposed on a roll of film between a regular size and a panoramic size, the camera comprising:

film feeding means for causing the roll of film contained within a cartridge to be taken up by a spool;

film rewinding means for causing the roll of film to be rewound into the cartridge; preliminary take-up means for causing the entire roll of film contained within the cartridge to be taken up by the spool after the photographic camera has been loaded with the roll of film, and then causing a predetermined quantity of the roll of film to be rewound into the cartridge for each photograph in order to make the photographic camera ready for photographing;

film length measuring means adapted for measuring a full length of the roll of film during the preliminary take-up and for determining a residual quantity of the roll of film on the basis of the film length having been taken up;

display means for displaying a current number of film frames on the roll of film still available for photographing; and changeover control means adapted to be operated by a user for selectively switching the picture size;

wherein, when said changeover control means is operated to switch the picture size from the regular size to the panoramic size, said film rewinding means is actuated to rewind a predetermined quantity of the roll of film and thereby to make the photographic camera ready for photographing in the panoramic size whereas, when said changeover control means is operated to switch the picture size from the panoramic size to the regular size, said film feeding means is actuated to take up a predetermined quantity of the roll of film and thereby to make the photographic camera ready for photographing in the regular size, wherein the number of film frames on the roll of film still available for photographing in the picture size for which the photographic camera is ready is calculated on the basis of a residual quantity of the roll of film, and wherein said calculated number of film frames still available for photographing is displayed by said display means.

16. The photographic camera as defined in claim 15, wherein said film length measuring means includes a photosensor for counting the number of film perforations passing thereby.

17. The photographic camera as defined in claim 15, wherein said display means includes a liquid crystal display panel adapted to display various photographic information.

18. The photographic camera as defined in claim 15 and further including an adjustable aperture frame for defining the size of the film frame to be exposed, wherein said adjustable aperture frame includes a fixed sized frame and a pair of dousers pivotally supported on respective axes corresponding to respective short sides of said fixed sized frame extending orthogonally to the direction in which the roll of film is transported.

* * * * *